United States Patent [19]

James

[11] Patent Number: 4,791,536
[45] Date of Patent: Dec. 13, 1988

[54] SOUND RESPONSIVE LIGHTED EARRINGS

[76] Inventor: Darold L. James, 405 6th Ave., Apt. 705, Tacoma, Wash. 98402

[21] Appl. No.: 142,937

[22] Filed: Jan. 12, 1988

[51] Int. Cl.$^4$ .............................................. F21L 15/08
[52] U.S. Cl. ....................................... 362/104; 362/32; 362/252; 362/251; 362/800; 362/806
[58] Field of Search ................. 362/103, 104, 32, 157, 362/184, 234, 252, 253, 800, 802, 806, 811, 812, 251

[56] References Cited

U.S. PATENT DOCUMENTS

| | | | |
|---|---|---|---|
| 3,737,647 | 6/1973 | Gomi | 362/104 |
| 4,009,381 | 2/1977 | Schreiber et al. | 362/104 X |
| 4,264,845 | 4/1981 | Bednarz | 362/104 |
| 4,719,544 | 1/1988 | Smith | 362/104 |

FOREIGN PATENT DOCUMENTS 2827886  1/1980  Fed. Rep. of Germany ...... 362/104

Primary Examiner—Stephen F. Husar
Attorney, Agent, or Firm—H. Jay Spiegel

[57] ABSTRACT

Disclosed herein are sound responsive lighted earrings. The earrings include a circuit board having mounted thereon a sound sensor connected to an amplifier and a digitizer designed to break up sounds into a plurality of frequency bands. A corresponding plurality of light emitting diodes are provided which are attached to a corresponding number of fiber optic cables having fiber optic strands extending therefrom. The earrings sense sounds and in response thereto cause respective ones of the LEDs and their corresponding optical fibers to be illuminated.

10 Claims, 1 Drawing Sheet

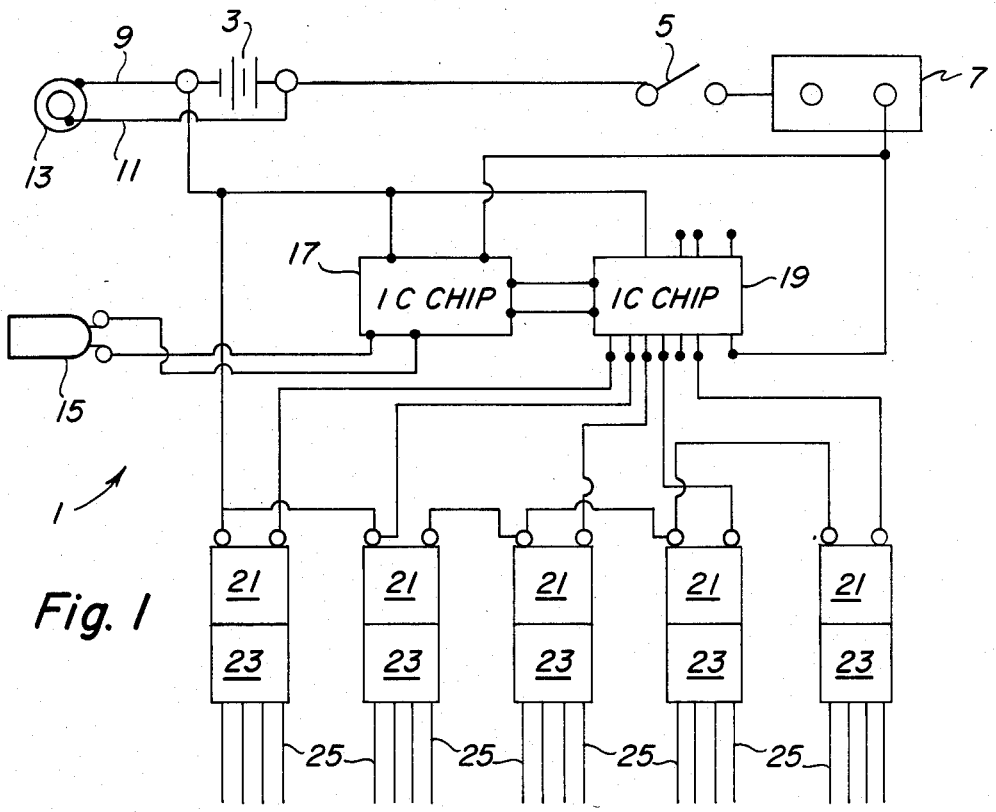
Fig. 1
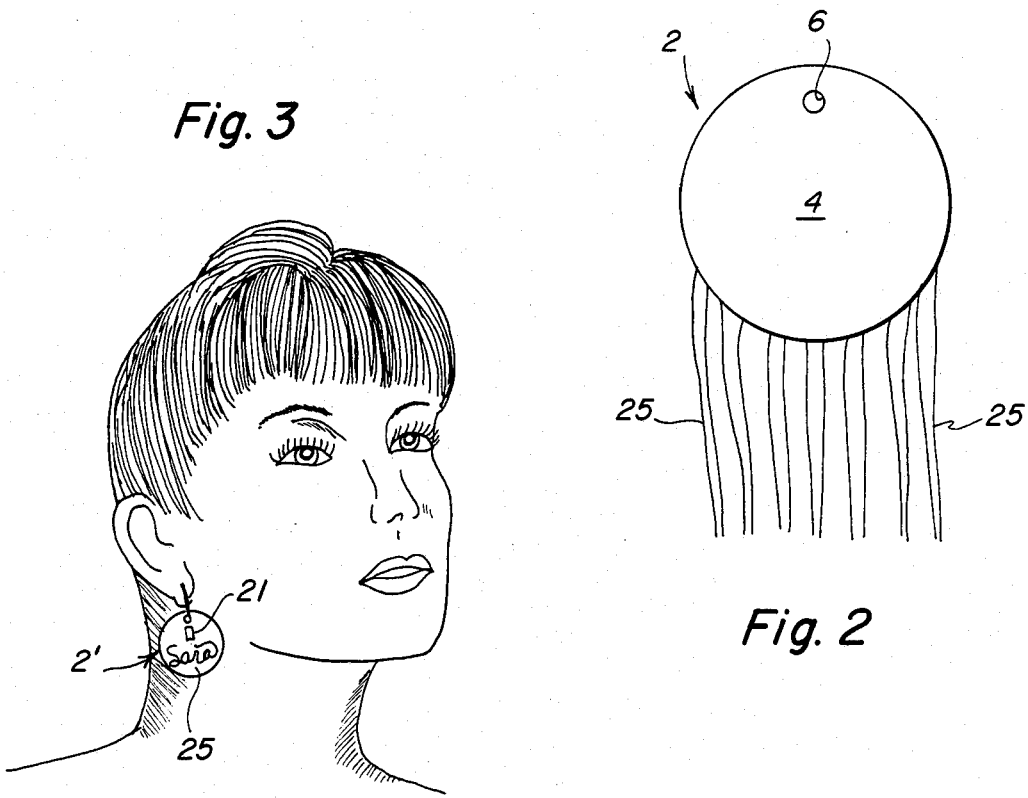
Fig. 3
Fig. 2

SOUND RESPONSIVE LIGHTED EARRINGS

BACKGROUND OF THE INVENTION

The present invention relates to improved sound responsive lighted earrings. In the prior art, it is known to provide illumination means on a pair of earrings. In this regard, the following prior art is known to Applicant:

U.S. Pat. No. 4,296,459 to DeLuca discloses light emitting electronic jewelry including circuitry with a light emitting diode and with the circuitry allowing the light emitting diode to flash either through the circuitry itself or through movements of the person on which the earring is attached by virtue of a mercury switch.

U.S. Pat. No. 4,605,882 to DeLuca discloses electronic jewelry including a light sensing device and circuitry responsive to sensing of light to flicker a light connected to the circuitry.

Furthermore, it is known to provide a lighting system which flickers and flashes responsive to sensing of sounds. U.S. Pat. No. 4,440,059 to Hunter discloses a sound responsive lighting device including light emitting diodes which are lit responsive to the sensing of sounds. However, there is no teaching or suggestion in this patent of the use of such a circuit on an earring.

SUMMARY OF THE INVENTION

The present invention overcomes the disadvantages found in the prior art as discussed above and provides a new and improved earring device which senses sound waves and in response thereto causes the flickering of light emitting diodes as well as optical fibers. The present invention includes the following interrelated aspects and features:

(a) In a first aspect of the present invention, the inventive earrings include a power supply which may be a miniature battery such as those which are used to power watches. A switching mechanism is provided to activate and deactivate the device so as to save battery power. This switch device may comprise a simple on-/off switch or, alternatively, may comprise a mercury switch which is tilt responsive both for activation and deactivation and to cause the lights to flicker responsive to movements of the wearer.

(b) The circuit further includes a sound sensor which may be a miniature microphone or other transducer which is connected to an audio digitizer by an audio amplifier. With this circuitry, sounds sense by the transducer are amplified and then broken up into a plurality of bands of individual frequency ranges.

(c) The audio digitizer has a plurality of outputs each of which corresponds to one such frequency band and each such output is connected to a light emitting diode having connected thereto a fiber optic cable.

(d) The fiber optic cable includes a plurality of optical fibers which hang down from the circuitry in an aesthetically pleasing manner as desired. For example, the optical fibers may be of differing lengths to provide a shaggy look.

(e) Alternatively, the light emitting diodes may be connected to individual fibers which are mounted on a display surface on one side of the circuit so as to write out a word, phrase or pleasing pattern.

Accordingly, it is a first object of the present invention to provide improved sound responsive lighted earrings.

It is a further object of the present invention to provide such earrings including a sound sensor coupled with lighting means via an amplifier and digitizer.

It is a further object of the present invention to provide such a device including a miniature battery and control switch.

These and other objects, aspects and features of the present invention will be better understood from the following detailed description of the preferred embodiments when read in conjunction with the appended drawing figures.

BRIEF DESCRIPTION OF THE DRAWINGS

FIG. 1 shows a schematic representation of the electrical circuit utilized in the present invention.

FIG. 2 shows a side view of a first embodiment of an earring incorporating circuitry of FIG. 1.

FIG. 3 shows a second embodiment of an earring incorporating the circuitry of FIG. 1.

SPECIFIC DESCRIPTION OF THE PREFERRED EMBODIMENTS

With reference first to FIG. 1, the inventive circuit 1, is seen to include a battery 3, a single pull single throw on-off switch 5 and a mercury switch 7. The battery 3 may be a miniature battery such as those which are used in watches a hearing aids and are known as lithium batteries. The mercury switch 7 is provided for two reasons. Firstly, it is provided to allow the circuit to be opened by tilting it to one side corresponding to an orientation of an earring when stored in a jewelry box. A second reason for the mercury switch 7 is that it will facilitate flickering and blinking of the lights of the circuit responsive to extreme movements of the wearer of the associated earrings.

If desired, conductors 9 and 11 may be provided in parallel with the battery 3 and connected to a connector 13 designed to be connected with a plug providing electrical power to the battery 3 to recharge it when the earrings are not being used.

With further reference to FIG. 1, it is seen that the circuit 1 includes a sound sensor 15 which may comprise a small microphone or other transducer designed to transform sound waves into electrical signals. The sensor 15 is connected with an audio amplifier chip 17 designed to amplify the signals received from the sensor 15. The amplifier chip 17 is connected to a audio digitizer chip 19 which is designed to receive electrical signals from the amplifier chip 17 and divide these signals up into a plurality of frequency bands. In the preferred embodiment of the present invention, the electrical signals are divided up into five frequency bands.

With further reference to FIG. 1, it is seen that the circuit includes a plurality of light emitting diodes 21 corresponding in number to the number of frequency bands in which the signals from the amplifier chip 17 are divided by the audio digitizer chip 19. Thus, in the example shown, five light emitting diodes 21 are provided. Each light emitting diode 21 is optically coupled to a fiber optic cable 23 so that illumination of a light emitting diode 21 will result in communication of the light to optical fibers 25.

In the operation of the circuit 1, with the switch 5 closed and the circuit 1 in an upright position causing the mercury switch 7 to be closed, sounds are sensed by the sensor 15 and are provided to the amplifier chip 17 where they are amplified and then provided to the audio digitizer chip 19 which breaks the signals up into five frequency bands with each band being outputted to a particular light emitting diode 21.

Each light emitting diode 21 is optically connected to optical fibers 25 via a fiber optic cable 23.

Whenever sounds are picked up by the sensor 15 in any of the frequency bands, the light emitting diode 21 corresponding to such frequency band is illuminated to there by cause illumination of the optical fibers 25. Further, extreme movements by the user which cause the mercury switch 7 to open and close will also cause flashing of any of the light emitting diodes 21 which happen to be lit during such movements. In this way, an interesting display results.

With reference to FIG. 2, a preferred design for an earring is seen and designated by the reference numeral 2. The earring 2 includes a substantially circular circuit board 4 which carries the circuit 1 on a back circuit thereof in the view shown in FIG. 2. Optical fibers 25 may hang down in differing lengths or in whatever pattern is desired for aesthetic effect. The hole 6 is provided for attachment means designed to attach the earring to the ear of the user.

FIG. 3 shows an alternative construction of an earring 2' which includes only a single light emitting diode 21 connected to a single optical fiber which spells out a design or a name. Of course, the concept illustrated in FIG. 3 could be extended by plurality of light emitting diodes 21 each connected to a single optical fiber 25 arranged in a predetermined pattern or patterns.

As such, an invention has been disclosed in terms of a preferred embodiment thereof which fulfills each an every one of the objects of the invention as set forth hereinabove. Of course, various changes, modifications and alterations of the teachings of the present invention may be contemplated by those skilled in the art without departing from the intended spirit and scope of the present invention. As such, it is intended that the present invention only be limited by the terms of the appended claims.

I claim:
1. An earring comprising:
    (a) a substantially fault body;
    (b) an electrical circuit mounted on one face of said body and including:
        (1) a miniature portable power source;
        (2) a sound sensor;
        (3) an audio digitizer which receives signals from said sound sensor and divides said signals into a plurality of signal bands, each said band falling within a distinct unique range of sound frequencies;
        (4) indicator means for indicating receipt of sound signals by said sound sensor, said indicator means comprising an indicator for each signal band; and
        (5) switch means for controlling activation of said circuit including a first manually-actuable switch and a second switch actuable responsive to orientation; and
    (c) means for releasably connecting said body to a person or object.
2. The invention of claim 1, wherein said body comprises a circuit board.
3. The invention of claim 1, wherein said power source comprises a battery.
4. The invention of claim 1, wherein said circuit further includes an amplifier interposed between said sound sensor and said audio digitizer.
5. The invention of claim 1, wherein said means for releasably connecting comprises a loop adapted to be inserted into an opening on said person or object.
6. The invention of claim 1, wherein each said indicator comprises:
    (a) illumination means; and
    (b) at least one optical fiber optically coupled to said illumination means.
7. The invention of claim 6, wherein said illumination means comprises a light emitting diode.
8. The invention of claim 6, wherein said at least one optical fiber comprises a plurality of optical fibers.
9. The invention of claim 6, wherein said at least one optical fiber depends downwardly below said body.
10. The invention of claim 6, wherein said at least one optical fiber is mounted on a face of said body opposite to said one face.

* * * * *